US012812523B2

(12) United States Patent
Park et al.

(10) Patent No.: US 12,812,523 B2
(45) Date of Patent: Nov. 24, 2026

(54) NETWORK SLICE ALLOCATION METHOD AND DEVICE IN WIRELESS COMMUNICATION SYSTEM

(71) Applicant: Samsung Electronics Co., Ltd., Gyeonggi-do (KR)

(72) Inventors: Sungjin Park, Gyeonggi-do (KR); Hyesung Kim, Gyeonggi-do (KR); Jicheol Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 262 days.

(21) Appl. No.: 18/705,786

(22) PCT Filed: Oct. 28, 2022

(86) PCT No.: PCT/KR2022/016745
§ 371 (c)(1),
(2) Date: Apr. 29, 2024

(87) PCT Pub. No.: WO2023/075522
PCT Pub. Date: May 4, 2023

(65) Prior Publication Data
US 2026/0143418 A1 May 21, 2026

(30) Foreign Application Priority Data
Oct. 29, 2021 (KR) ........................ 10-2021-0147316

(51) Int. Cl.
*H04W 48/18* (2009.01)
*H04W 8/20* (2009.01)
*H04W 72/0453* (2023.01)

(52) U.S. Cl.
CPC ............. *H04W 48/18* (2013.01); *H04W 8/20* (2013.01); *H04W 72/0453* (2013.01)

(58) Field of Classification Search
CPC .... H04W 8/20; H04W 48/18; H04W 72/0453
See application file for complete search history.

(56) References Cited

U.S. PATENT DOCUMENTS

| | | | |
|---|---|---|---|
| 11,032,710 B2 | 6/2021 | Faccin et al. | |
| 2017/0367036 A1 | 12/2017 | Chen et al. | |

(Continued)

FOREIGN PATENT DOCUMENTS

| | | |
|---|---|---|
| EP | 3493649 | 6/2019 |
| KR | 10-2019-0018707 | 2/2019 |

(Continued)

OTHER PUBLICATIONS

PCT/ISA/210 Search Report dated Feb. 2, 2023 issued on PCT/KR2022/016745, pp. 11.

(Continued)

*Primary Examiner* — Brian P Cox

(74) *Attorney, Agent, or Firm* — The Farrell Law Firm, P.C.

(57) ABSTRACT

The present disclosure relates to a 5G or 6G communication system for supporting a higher data transmission rate. The present disclosure can be applied to intelligent services (for example, smart homes, smart buildings, smart cities, smart cars or connected cars, healthcare, digital education, retail, security- and safety-related services, and the like) on the basis of 5G communication technology and IoT-related technology. The present disclosure relates to a method and a device for allocating a network slice to an application server that provides a service to a user in a wireless communication system or a mobile communication system.

12 Claims, 8 Drawing Sheets

(56) References Cited

U.S. PATENT DOCUMENTS

| | | | | |
|---|---|---|---|---|
| 2020/0221541 | A1 | 7/2020 | Yan | |
| 2022/0264443 | A1 | 8/2022 | Lee et al. | |
| 2024/0193021 | A1 * | 6/2024 | Pateromichelakis | ... G06F 9/547 |

FOREIGN PATENT DOCUMENTS

| | | |
|---|---|---|
| KR | 10-2021-0126584 | 10/2021 |
| KR | 10-2022-0116821 | 8/2022 |

OTHER PUBLICATIONS

PCT/ISA/237 Written Opinion dated Feb. 2, 2023 issued on PCT/KR2022/016745, pp. 4.

Lenovo, Motorola Mobility, "Network Slice Capability Management functional model", 3GPP TSG-SA6 Meeting #42-e, S6-210473, Online, Mar. 1, 2021-Mar. 9, 2021, pp. 8.

* cited by examiner

NETWORK SLICE ALLOCATION METHOD AND DEVICE IN WIRELESS COMMUNICATION SYSTEM

CROSS-REFERENCE TO RELATED APPLICATIONS

This application is a U.S. National Phase Entry of PCT International Application No. PCT/KR2022/016745, which was filed on Oct. 28, 2022, and claims priority to Korean Patent Application No. 10-2021-0147316, which was filed on Oct. 29, 2021, the entire disclosure of each of which is incorporated herein by reference.

TECHNICAL FIELD

The disclosure relates to a wireless communication system and, more specifically, to an apparatus and a method for providing network slicing in a wireless communication system or a mobile communication system.

BACKGROUND ART 5G mobile communication technologies define broad frequency bands such that high transmission rates and new services are possible, and can be implemented not only in “Sub 6 GHz” bands such as 3.5 GHz, but also in “Above 6 GHz” bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G.

In the initial stage of 5G mobile communication technologies, in order to support services and to satisfy performance requirements in connection with enhanced Mobile BroadBand, (eMBB), Ultra Reliable & Low Latency Communications (URLLC), and massive Machine-Type Communications (mMTC), there has been ongoing standardization regarding beamforming and massive MIMO for alleviating radio-wave path loss and increasing radio-wave transmission distances in mmWave, numerology (for example, operating multiple subcarrier spacings) for efficiently utilizing mmWave resources and dynamic operation of slot formats, initial access technologies for supporting multi-beam transmission and broadbands, definition and operation of BWP (BandWidth Part), new channel coding methods such as a LDPC (Low Density Parity Check) code for large-capacity data transmission and a polar code for highly reliable transmission of control information, L2 pre-processing, and network slicing for providing a dedicated network customized to a specific service.

Currently, there is ongoing discussion regarding improvement and performance enhancement of initial 5G mobile communication technologies in view of services to be supported by 5G mobile communication technologies, and there has been physical layer standardization regarding technologies such as V2X for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for securing coverage in an area in which communication with terrestrial networks is impossible, and positioning.

Moreover, there has been ongoing standardization in wireless interface architecture/protocol fields regarding technologies such as Industrial Internet of Things (IIoT) for supporting new services through interworking and convergence with other industries, IAB (Integrated Access and Backhaul) for providing a node for network service area expansion by supporting a wireless backhaul link and an access link in an integrated manner, mobility enhancement including conditional handover and DAPS (Dual Active Protocol Stack) handover, and two-step random access for simplifying random access procedures (2-step RACH for NR). There also has been ongoing standardization in system architecture/service fields regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

If such 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with extended Reality (XR) for efficiently supporting AR, VR, and the like (XR=AR+VR+MR), 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for securing coverage in terahertz bands of 6G mobile communication technologies, Full Dimensional MIMO (FD-MIMO), multi-antenna transmission technologies such as array antennas and large-scale antennas, metamaterial-based lenses and antennas for improving coverage of terahertz band signals, high-dimensional space multiplexing technology using OAM (Orbital Angular Momentum), and RIS (Reconfigurable Intelligent Surface), but also full-duplex technology for increasing frequency efficiency of 6G mobile communication technologies and improving system networks, AI-based communication technology for implementing system optimization by utilizing satellites and AI (Artificial Intelligence) from the design stage and internalizing end-to-end AI support functions, and next-generation distributed computing technology for implementing services at levels of complexity exceeding the limit of UE operation capability by utilizing ultra-high-performance communication and computing resources.

With the development of the 5G communication system, a technology of network slices (or network slicing) for a radio access network (RAN) and core network (CN) architecture has been introduced.

DETAILED DESCRIPTION OF THE INVENTION

Technical Problem

The disclosure is to provide a method and an apparatus in which a vertical application server receives an allocation of a network slice on a 5G system and an application layer in order to provide services.

Technical Solution

According to an embodiment of the disclosure for solving the above-described problems, an operation method of a network slice capability management (NSCM) server in a wireless communication system includes requesting and obtaining S-NSSAI and DNN information from and storing the same in a 5G system (e.g., NRF/NSSF, etc.), transferring, upon reception of a network slice request from a vertical application layer (VAL) server, the stored S-NSSAI and DNN information, determining, upon reception of a network slice allocation request from the VAL server, whether the requested network slice is available, and transferring the available network slice information to an NSCM client included in UEs designated by the VAL server.

In the same embodiment, an operation method of the VAL server in a wireless communication system includes requesting and obtaining network slice information from the NSCM server, selecting, based on the obtained network slice information, a network slice suitable for a service to be provided, and requesting and identifying allocation of the selected network slice from the NSCM server.

In the same embodiment above, an operation method of the NSCM client includes receiving network slice information from the NSCM server, storing and applying the received network slice information in the UE, and transmitting a message identifying reception of the network slice information.

Alternatively, according to another embodiment of the disclosure for achieving the above-described problem to be solved, a method of determining, by an NSCM server, a network slice to be used for a service includes determining, upon reception of a network slice allocation request from a VAL server, a suitable network slice among stored network slices according to a service feature to be provided by the VAL server, and transferring the determined network slice information to an NSCM client.

In the other embodiment of the disclosure, a method of transferring, by an NSCM server, network slice information determined to be used to a UE includes transferring the network slice information determined to be used to a policy control function (PCF) of the 5G system and identifying the transfer of the network slice information.

In the same embodiment, an operation method of the PCF includes transferring the received network slice information to the UE via an access and mobility management function (AMF) so that the UE updates the network slice information and use the updated network slice information for further services.

In the above embodiments, the method of obtaining the network slice from the 5G system by the NSCM server includes receiving network slice information available for the 5G system by using a subscribe/notify method whenever the network slice information is updated, or a method of receiving one-time network slice information using a discovery method.

A method of operating a vertical application layer (VAL) server for allocating a network slice in a wireless communication system according to an embodiment of the disclosure may include transmitting, to a network slice capability management (NSCM) server, a first message including an application ID and requesting network slice information, receiving, in response to the first message, a second message including available single-network slice selection assistance information (S-NSSAI) and an available data network name (DNN) from the NSCM server, determining S-NSSAI and a DNN to be used in the VAL server based on the second message, and transmitting a network slice allocation request message including the determined S-NSSAI and DNN to the NSCM server.

A method of operating a network slice capability management (NSCM) server for allocating a network slice in a wireless communication system according to an embodiment of the disclosure may include receiving, from a vertical application layer (VAL) server, a first message including an application ID and requesting network slice information, transmitting, in response to the first message, a second message including available single-network slice selection assistance information (S-NSSAI) and an available data network name (DNN) to the VAL server, and receiving, from the VAL server, a network slice allocation request message including the S-NSSAI and DNN determined by the VAL server based on the second message.

A method of operating a user equipment (UE) for allocating a network slice in a wireless communication system according to an embodiment of the disclosure may include receiving, from a network slice capability management (NSCM) server, a network slice information delivery message including an application ID and single-network slice selection assistance information (S-NSSAI) and a data network name (DNN), the S-NSSAI and DDN being determined by a vertical application layer (VAL) server, storing the S-NSSAI and the DNN, and transmitting a response message with respect to the network slice information delivery message to the NSCM server.

Advantageous Effects

A method and an apparatus according to an embodiment of the disclosure may allow a VAL server or NSCM server to select an appropriate network slice according to services to be provided, by acquiring network slice information from a 5G network system that provides a network slice function.

In addition, a method and an apparatus according to an embodiment of the disclosure may efficiently transmit network slice information determined to be used to a UE and configure the same therefor.

Further, in a method and an apparatus according to an embodiment of the disclosure, an NSCM server may efficiently obtain network slice information suitably for a purpose thereof from a 5G system.

MODE FOR CARRYING OUT THE INVENTION

Figure 1:
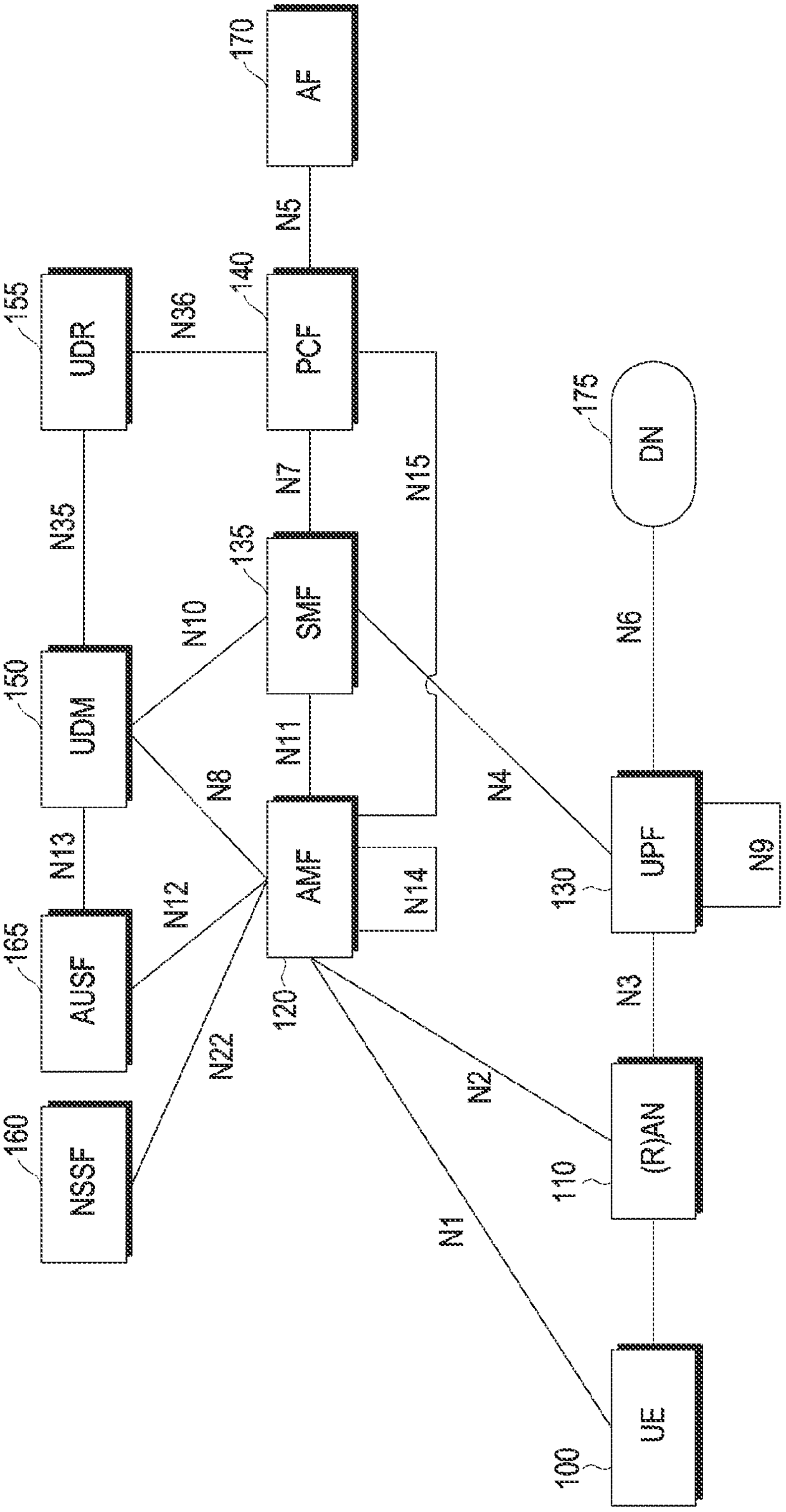
FIG. 1 illustrates a structure of a mobile communication system according to an embodiment of the disclosure.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Furthermore, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The disclosure provides an apparatus and a method for providing network slices (or network slicing) in a wireless communication system. Specifically, the disclosure describes techniques for managing network slice information in a wireless communication system that provides a network slice function. Further, techniques for interworking between a wireless communication system and a UE are described.

In the following description, terms referring to signals, terms referring to channels, terms referring to control information, terms referring to interfaces between network entities, terms referring to device elements, and the like are illustratively used for the sake of convenience. Therefore, the disclosure is not limited by the terms as used below, and other terms referring to subjects having equivalent technical meanings may be used.

Furthermore, various embodiments of the disclosure will be described using terms employed in some communication standards (e.g., 3rd generation partnership project (3GPP) standards), but they are merely an example for the sake of description. Various embodiments of the disclosure may also be easily applied to other communication systems through modifications.

In the 3GPP standard, 5G network system architecture and procedures are standardized. Mobile communication operators may provide various services in 5G networks. In order to provide each service, a mobile communication service provider needs to satisfy different service requirements (for example, a delay time, a communication range, a data rate, a bandwidth, a reliability, etc.) for each service. To this end, a mobile communication service provider may configure network slices and allocate network resources suitable for specific services for each network slice or set of network slices. A network resource may refer to a network function (NF), a logical resource provided by the NF, or radio resource allocation of a base station.

For example, a mobile communication operator may configure network slice A to provide a mobile broadband service, configure network slice B to provide a vehicle communication service, and configure network slice C to provide an IoT service. That is, in the 5G network as described above, a corresponding service may be efficiently provided to a UE through a network slice specialized to suit the characteristics of each service.

FIG. 1 illustrates the structure of a mobile communication system according to an embodiment of the disclosure.

Referring to FIG. 1, a 5G system (5GS) may include a user equipment (UE) 100, a base station ((radio) access networks ((R)AN) 110, and a 5G core network (5GC).

The 5G core network may include an access and mobility management function (AMF) 120, a session management function (SMF) 135, a user plane function (UPF) 130, a policy control function (PCF) 140, a unified data management (UDM) 150, a network slice selection function (NSSF) 160, an authentication server function (AUSF) 165, and a unified data repository (UDR) 155. The UE 100 may access the 5G core network through the base station 110. Hereinafter, UE may be referred to as a terminal and (R)AN may be referred to as a base station. Additionally, the 5G core network may further include an application function (AF) 170 and a data network (DN) 175.

According to an embodiment, the AMF 120 may be a network function (NF) that manages wireless network access and mobility for the UE 100.

The SMF 135 is an NF that manages a session for a UE, and session information may include quality of service (QOS) information, charging information, and information on packet processing.

The UPF 130 is an NF that processes user traffic (e.g., user plane traffic) and may be controlled by the SMF 135.

The PCF 140 may be an NF that manages an operator policy (PLMN policy) for providing services in a wireless communication system. In addition, the PCF 140 may be divided into a PCF in charge of an access and mobility (AM) policy and a UE policy and a PCF in charge of a session management (SM) policy. The PCF in charge of AM/UE policy and the PCF in charge of SM policy may be logically or physically separated NFs or logically or physically one NF.

The UDM 150 may be an NF that stores and manages subscriber information (UE subscription) of the UE.

The UDR 155 is an NF or database (DB) that stores and manages data. The UDR 155 may store subscription information of the UE and provide the subscription information of the UE to the UDM 150. In addition, the UDR 155 may store operator policy information and provide the operator policy information to the PCF 140.

The NSSF 160 may be an NF that performs a function of selecting network slice instances servicing the UE or determining network slice selection assistance information (NSSAI).

The AUSF 165 may be an NF that performs a function to support authentication for 3GPP access and non-3GPP access.

The AF 170 may be an NF that provides functions for services according to the disclosure.

The DN 175 may refer to a data network capable of providing operator services, Internet access, or third party services.

Figure 2:
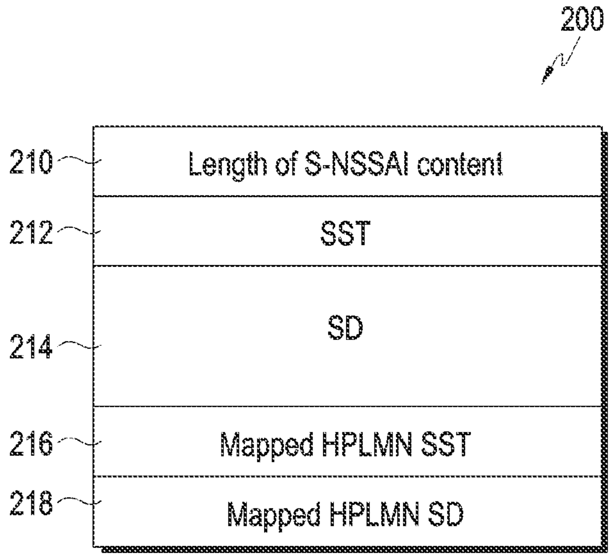
FIG. 2 illustrates a configuration of a delimiter IE for classifying network slices according to an embodiment of the disclosure.

FIG. 2 illustrates a configuration of a delimiter IE for classifying network slices according to an embodiment of the disclosure.

Single-network slice selection assistance information (S-NSSAI) defined by a 3GPP may be used as a delimiter for classifying network slices. FIG. 2 illustrates an example of such an S-NSSAI information element (IE) constitution.

One S-NSSAI 200 may include at least one of a slice/service type (SST) 216 used in a home public land mobile network (HPLMN), a slice differentiator (SD) 218 used in the HPLMN, an SST 212 used in a serving PLMN, and an SD 214 used in the serving PLMN. Further, the S-NSSAI IE may further include a field 210 indicating a length of content included in the S-NSSAI IE.

In a non-roaming situation, the SST 212 used in the serving PLMN may be the same as the SST 216 used in the HPLMN, and the SD 214 used in the serving PLMN may be the same as the SD 218 used in the HPLMN.

In a roaming situation, the SST 212 used in the serving PLMN may be an SST used in a visited PLMN (VPLMN), and the SD 214 used in the serving PLMN may be an SD used in the VPLMN.

Each SST and SD value constituting one S-NSSAI may or may not have a value according to the situation.

The network slice selection assistance information (NSSAI) may be configured by one or more S-NSSAIs.

Figure 3:
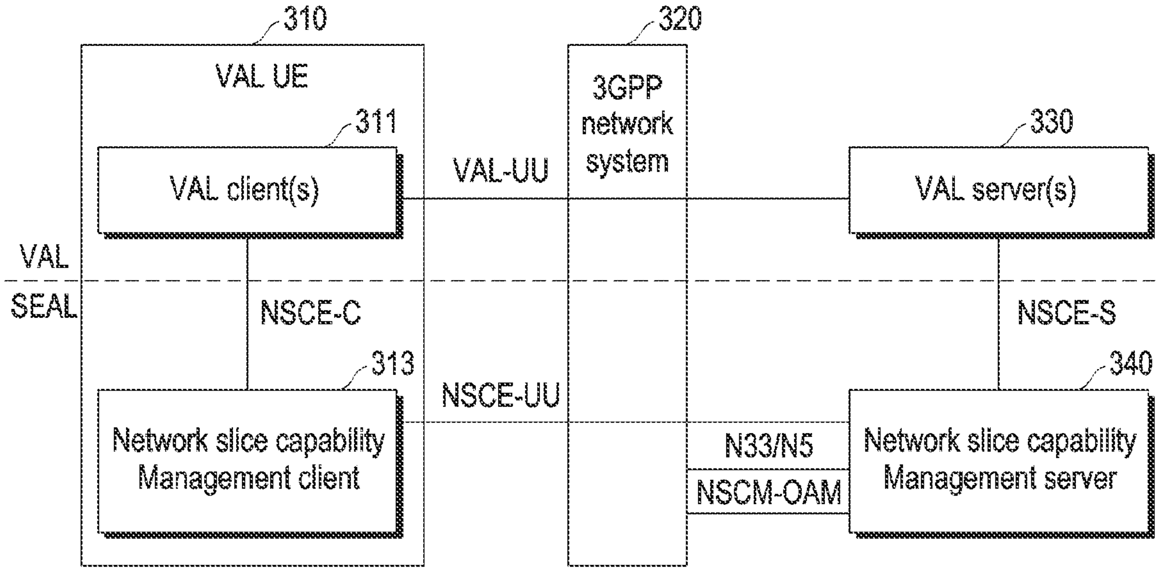
FIG. 3 illustrates a system configured to support a network slice to a VAL server in an application layer at the time of providing a vertical service according to an embodiment of the disclosure.

FIG. 3 illustrates a system configured to support network slices to a VAL server in an application layer when providing a vertical service according to an embodiment of the disclosure.

Referring to FIG. 3, the system may include a vertical application layer (VAL) UE 310, a 3GPP network system 320, a VAL server 330, and a network slice capability management (NSCM) server 340. According to an embodiment, the VAL UE 310 may include a VAL client 311 and a network slice capability management (NSCM) client 313. “NSCM” described in this disclosure may also be expressed as network slice capability exposure (NSCE).

The VAL server 330 may refer to an application server that operates services provided to users (e.g., IoT, unmanned flight, V2X, factory automation, etc.). The VAL client 311 may refer to a client that receives services provided to users (e.g., IoT, unmanned flight, V2X, factory automation, etc.).

The NSCM server 313 and the NSCM client 313 acquire and store relevant information so that the VAL server 330 and the VAL client 311 may utilize network slices, and performs a role in responding to requests from the VAL server 330 and the VAL client 311 (e.g., transferring network slice information, determining a network slice suitable for service characteristics, changing the network slice, etc.).

The NSCM server 340 may establish a reference point with the VAL server 330 and the NSCM client 313 to receive network slice-related requests and respond thereto. According to an embodiment, the NSCM server 340 may establish reference points with the network functions (NFs) in the 5G system to transfer network slices to be used by the VAL server 330 or NSCM to the 5G system, and to request necessary follow-up procedures. According to an embodiment, the NSCM server 340 may establish N33/N5, which is a reference point, with a network exposure function (NEF) and a policy control function (PCF) to exchange network slice information. In this disclosure, the N33/N5 reference point is only an example to organize an embodiment, and is not limited to using only two reference points to obtain network slice information.

Figure 4:
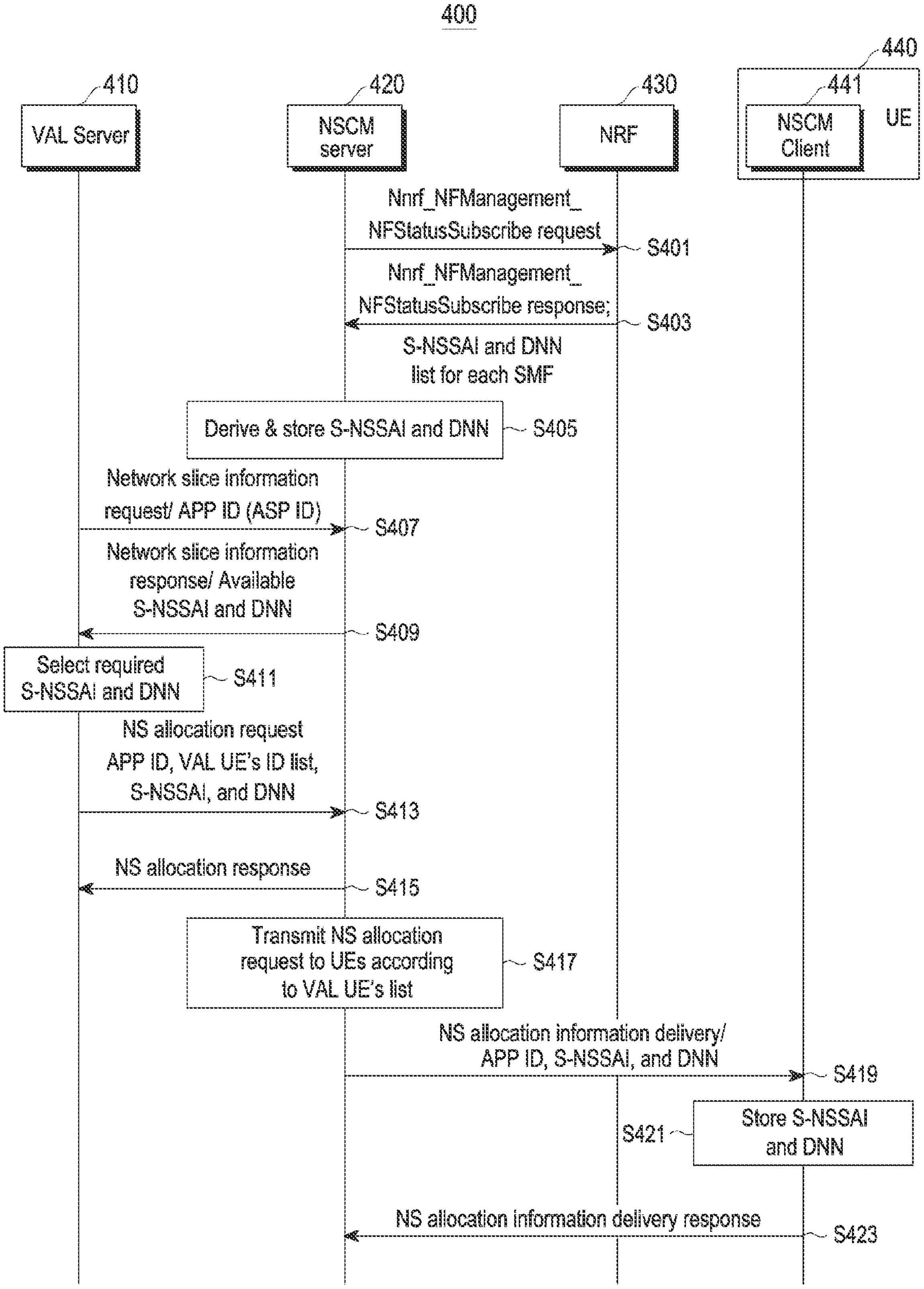
FIG. 4 is a flowchart illustrating a process of allocating a network slice to a VAL server according to an embodiment of the disclosure.

FIG. 4 is a flowchart illustrating a process of allocating a network slice to a VAL server according to an embodiment of the disclosure. FIG. 4 shows a procedure relating to a method in which the VAL server selects a network slice suitable for a service after acquiring network slice and DNN information from an NSCM server, and transmits the selected network slice to the UE.

Referring to FIG. 4, a system 400 may include a VAL server 410, an NSCM server 420, an NRF 430, and a UE 440. According to an embodiment, the UE 440 may include an NSCM client 441 that transmits and receives information to and from the NSCM server 420. According to an embodiment, the NRF 430 shown in FIG. 4 may be replaced by another network function or other network entity within a 5G core network (5GC). For example, the NRF 430 may be replaced by a 5G system network slice selection function (NSSF).

The NSCM server 420 may designate, as the SMF, the NF type of an Nnrf_NFManagement_NFStatusSubscribe request message and transmit the message to the NRF 430 in the 5G system (S401). The NSCM server 420 may receive an Nnrf_NFManagement_NFStatusSubscribe response message including S-NSSAI and DNN information allocated to each SMF from the NRF 430 (S403). According to an embodiment, the Nnrf_NFManagement_NFStatusSubscribe response message is a subscribe message, and the NSCM server 420 may obtain update information from the NRF 430 whenever S-NSSAI and DNN information in each SMF are updated. The NSCM server 420 may derive the S-NSSAI and DNN based on the Nnrf_NFManagement_NFStatusSubscribe response message and store all acquired pieces of S-NSSAI and DNN information (S405).

While the NSCM server 420 obtaining network slice information from the NRF 430 is an embodiment, the technical ideas of the disclosure are not limited to the NSCM server 420 obtaining network slice information from the NRF 430 only, and the NSCM server 420 may obtain network slice information from other network functions within the 5G system. According to an embodiment, the NSCM server 420 may obtain network slice information through an operation provided by a 5G system network slice selection function (NSSF).

At the time of providing initial services, the VAL server 410 may identify whether there is an allocated network slice and then, if there is no allocated network slice, the VAL server 410 may perform subsequent procedures. The VAL server 410 may request network slice information from the NSCM server 420 (S407). According to an embodiment, a message requesting for network slice information may include an application (APP) ID of the VAL server 410 to be provided. According to an embodiment, the message requesting for network slice information may further include an application service provider (ASP) ID.

The NSCM server 420 may identify the APP ID included in the message requesting for network slice information to identify whether the APP ID is a pre-allocated APP ID of the VAL server. According to an embodiment, the NSCM server 420 may, in the case of a pre-allocated APP ID, transmit currently allocated network slice information to the VAL server 410. According to an embodiment, the NSCM server 420 may transmit currently available network slice information (S-NSSAI list and DNN List) to the VAL server 410 when there is no network slice allocated to the corresponding APP ID (S409). When network slice information provided for each application service provider is different, the NSCM server 420 may perform identification through the ASP ID. Thereafter, only network slice information provided to the corresponding ASP may be provided to the VAL server 410.

The VAL server 410 may determine the S-NSSAI and DNN to be used, by considering the service type and service requirements to be provided among the received available S-NSSAI and DNN (S411). The VAL server 410 may transmit a network slice allocation request message to the NSCM server 420 so that the determined network slice information may be used in the 5G system (S413). According to an embodiment, the network slice allocation request message may include at least one of APP ID, S-NSSAI, DNN, and information of a list of UEs provided with VAL service (or VAL UE's ID List). According to an embodiment, in order for each UE to receive network slice service, network slice information matching the serviced App should be stored in the UE, and thus the network slice allocation request message may include a list of UEs provided with VAL service. When using the 5G system network slice, data may be transmitted according to the traffic descriptor in a UE route selection policy (URSP) of the UE 440 (refer to 3GPP standard technology).

After identifying the VAL UE's ID list in the received network slice allocation request message, the NSCM server 420 may transfer the S-NSSAI and DNN information allocated to the VAL server to the NSCM client 441 for each UE along with the APP ID (S417 and S419), and may transmit a response message to the VAL server 410 (S415). According to an embodiment, a timepoint at which the response message (ACK/NACK) for the network slice allocation request message is transmitted is possible at any timepoint after receiving the request message.

The NSCM server 420 may transmit a network slice allocation information delivery message to the NSCM client 441 (S419). According to an embodiment, the network slice allocation information delivery message may include at least one of APP ID, S-NSSAI, and DNN.

The NSCM client 441 may store network slice information (S-NSSAI) and DNN, which are allocated to the VAL server 410, in the UE 440 (S421). The S-NSSAI and DNN information stored in the UE may update S-NSSAI and DNN information in the URSP in the UE. According to an embodiment, there may be cases in which S-NSSAI and DNN information in the URSP in the UE cannot be updated according to the policy of the operator or UE vendor and the standard technology guide. At this time, NSSAI and DNN information may be independently stored and applied in the UE separately from the URSP. The NSCM client 441 may transmit a network slice allocation information delivery response message to the NSCM server 420 (S423).

Figure 5:
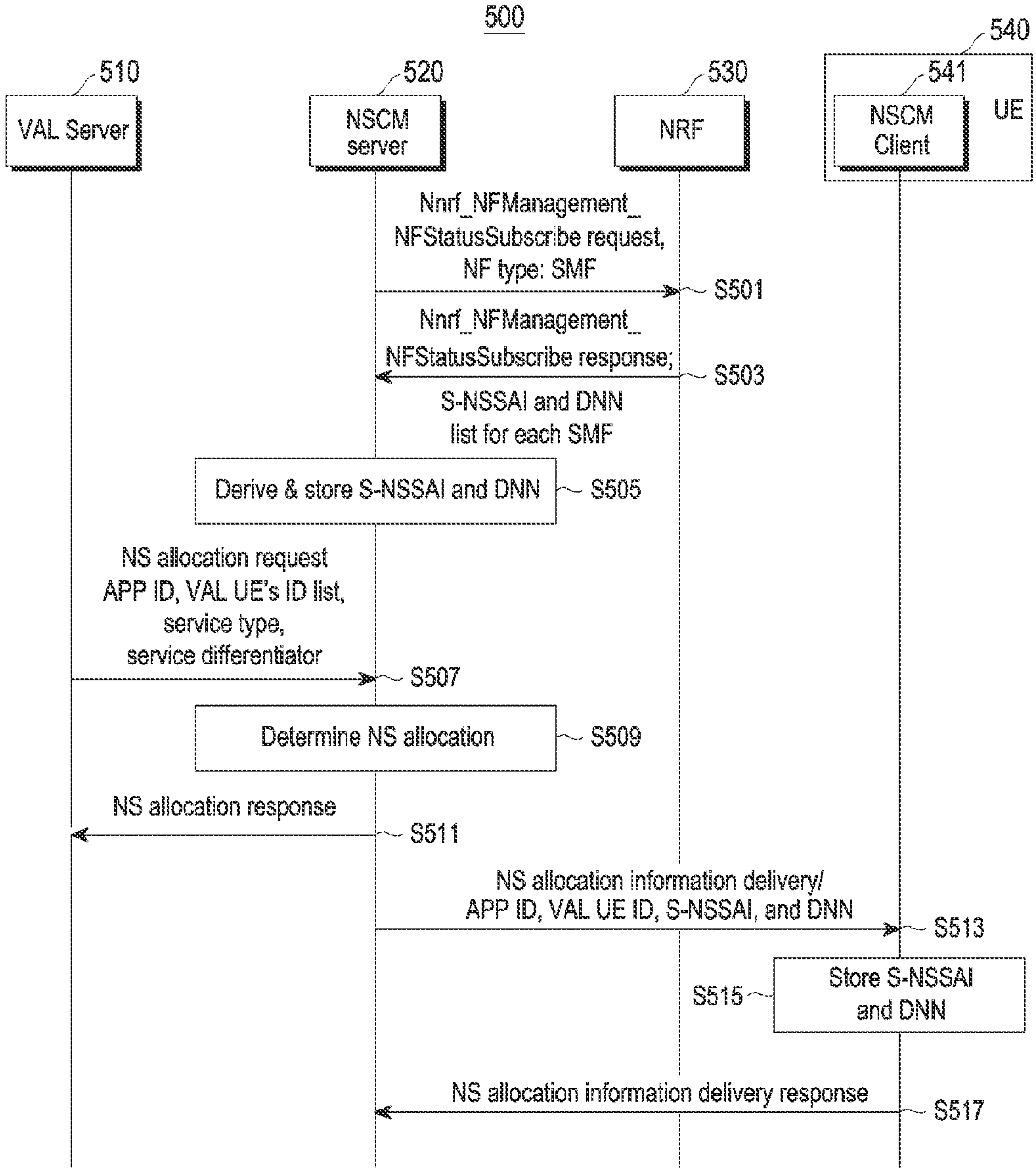
FIG. 5 is a flowchart illustrating a process of allocating a network slice to a VAL server according to another embodiment of the disclosure.

FIG. 5 is a flowchart illustrating a process of allocating a network slice to a VAL server according to another embodiment of the disclosure. In FIG. 5, there is illustrated a procedure in which, when an NSCM server receives a network slice allocation request from the VAL server after acquiring network slice and DNN information from a network function in a 5G system, the NSCM server identifies the service type transmitted by the VAL server, determines a suitable network slice, and then transmits the same to a UE.

Referring to FIG. 5, a system 500 may include a VAL server 510, an NSCM server 520, an NRF 530, and a UE 540. According to an embodiment, the UE 540 may include an NSCM client 541 that transmits and receives information to and from the NSCM server 520. According to an embodiment, the NRF 530 shown in FIG. 5 may be replaced by another network function or other network entity within a 5G core network (5GC). For example, the NRF 530 may be replaced by a 5G system network slice selection function (NSSF).

The process by which the NSCM server 510 acquires and stores network slice information and DNN from the NRF 530 or NSSF in the 5G system (S501 to S505) is the same as the process (S401 to S405) described above in FIG. 4, and thus the explanation thereof will be omitted.

The NSCM server 520 may receive a network slice allocation request message from the VAL server 510 (S507), According to an embodiment, the network slice allocation request message may include at least one of APP ID, VAL UE's ID List, a service type, and a service differentiator.

The NSCM server 520 may identify the service type or service differentiator delivered by the VAL server 510 and allocate, to the VAL server 510, a matching network slice among available network slices (S509).

As an example of an S-NSSAI selection method, the VAL server 510 may select one of the standardized SST values and include the selected value, as a service type item, in the network slice allocation request message (S507) and transmit the same. The standardized SST value may be enhanced mobile broadband (eMBB), ultra-reliable low latency communication (URLLC), massive Internet of Things (MIoT) or vehicle to X (V2X). According to an embodiment, the VAL server 510 may transmit a network slice allocation request message (S507) by including a service differentiator value therein. After receiving the values of service type and service differentiator, the NSCM server 520 may identify the S-NSSAIs managed by the NSCM and then allocate the S-NSSAI that matches the values of service type and service differentiator to the VAL server 510 (S509). Both of the above two information elements (service type and service differentiator) are optionally transmitted information, and if only one is transferred, S-NSSAI matched using only one piece of information may be allocated. If there is no IE or no S-NSSAI matching to any of the above IEs, the default S-NSSAI value may be allocated or the network operator may be requested to generate new S-NSSAI.

In another embodiment of selecting S-NSSAI, if there is at least one SST and service differentiator pre-agreed by a business relation between an operator for providing a network slice and an operator for receiving the rental, the corresponding information element may be transmitted by being included in a network slice allocation request message (S507). The NSCM server 520 may identify whether an agreed SST or service differentiator, or both exist in the received network slice allocation request message, and if existing, perform S-NSSAI allocation (S509). Hereinafter, the subsequent procedure, that is, an operation of the NSCM server 520 for transmitting a response message to the VAL server 510 (S511), an operation of the NSCM server 520 for transferring network slice information (APP ID, VAL UE ID, S-NSSAI, and DNN) to the UE 540 (S513), an operation of storing S-NSSAI and DNN in the UE (S515), and an operation of transmitting a network slice information delivery response message from the UE 540 to the NSCM server 520 (S517) are the same as those described above in FIG. 4.

Figure 6:
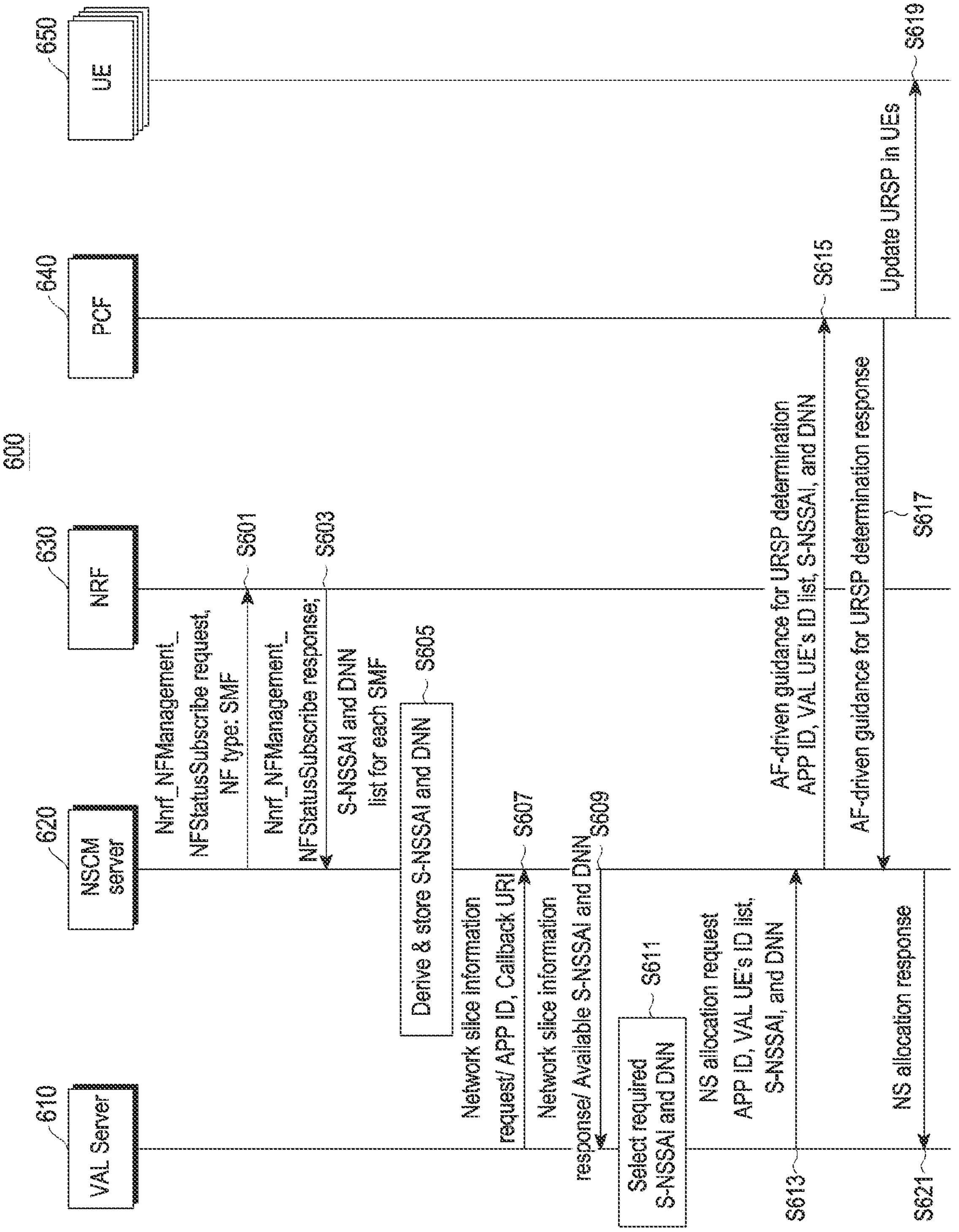
FIG. 6 is a flowchart illustrating a process of allocating a network slice to a VAL server according to another embodiment of the disclosure.

FIG. 6 is a flowchart illustrating a process of allocating a network slice to a VAL server according to another embodiment of the disclosure. In FIG. 6, there is illustrated a procedure of transferring network slice information allocated to a UE by updating the URSP of the 5G system PCF with the network slice information allocated to the VAL server.

The embodiment proposed in FIG. 6 includes a procedure of acquiring network slice information from the 5G system described in FIG. 4 or 5 and allocating a network slice to be used by a VAL server. For convenience of explanation, although FIG. 6 shows the VAL server performing the procedure by selecting S-NSSAI and DNN in the same manner as that of FIG. 4, a method in which the NSCM server allocates a network slice to the VAL server as shown in FIG. 5 may also be applied to the embodiment of FIG. 6.

Referring to FIG. 6, a system 600 may include a VAL server 610, an NSCM server 620, an NRF 630, and a UE 640. According to an embodiment, the UE 640 may include an NSCM client 641 that transmits and receives information to and from the NSCM server 620. According to an embodiment, the NRF 630 shown in FIG. 6 may be replaced by another network function or other network entity within a 5G core network (5GC). For example, the NRF 630 may be replaced by a 5G system network slice selection function (NSSF).

Operations S601 to S613 shown in FIG. 6 may be identical to or substantially the same as operations S401 to S413 shown in FIG. 4.

The NSCM server 620 may include network slice information determined to be used by the VAL server 610 in an AF-driven guidance for URSP determination message and transmit the same to the PCF 640 (S615). According to an embodiment, the AF-driven guidance for URSP determination message may include at least one of App ID, S-NSSAI, DNN, and VAL UE List.

The PCF 640 may transmit a response message (Ack/Nack) with respect to the AF-driven guidance for URSP determination message to the NSCM server 620 (S615). The PCF 640 may receive the AF-driven guidance for URSP determination message, update the URSP in the PCF, and transmit URSP information to the UE 650 through an AMF (S619) (AMF is omitted in FIG. 6.).

The NSCM server 620 may transmit a response message with respect to the network slice allocation request message to the VAL server 610 (S621). According to an embodiment, a timepoint of transmitting the response message in S621 is possible at any timepoint after receiving the network slice allocation request message.

Figure 7:
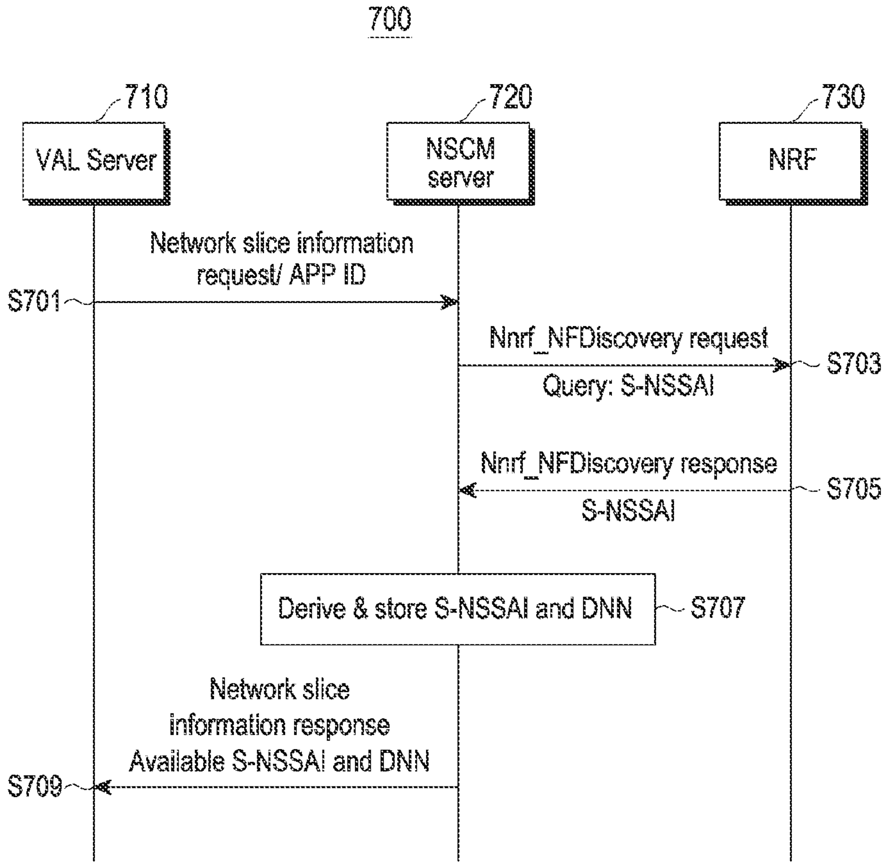
FIG. 7 is a flowchart illustrating a process in which an NSCM server obtains a network slice according to an embodiment of the disclosure.

FIG. 7 is a flowchart illustrating a process in which an NSCM server obtains a network slice according to an embodiment of the disclosure.

In FIG. 7, instead of the Subscribe/Notify method used in the previous embodiments (FIGS. 4 to 6), that is, a method of receiving update information whenever the network slice is updated in the 5G system, there is illustrated a method of transferring information only once when a network slice information request message (Nnrf_NFDiscovery Request) is transmitted.

Referring to FIG. 7, a system 700 may include a VAL server 710, an NSCM server 720, and an NRF 730. According to an embodiment, the NRF 730 shown in FIG. 7 may be replaced by another network function or other network entity within a 5G core network (5GC). For example, the NRF 730 may be replaced by a 5G system network slice selection function (NSSF).

The NSCM server 720 may receive a network slice information request message from the VAL server 710 (S701). The network slice information request message may include an APP ID, and the NSCM server 720 may identify whether network slicing on the VAL server 710 is possible.

The NSCM server 720 may transmit a Nnrf_NFDiscovery request message to the NRF 730 (S703). The Nnrf_NFDiscovery request message may include 'S-NSSAI' and 'DNN' attribute identifiers.

The NRF 730 may receive the Nnrf_NFDiscovery request message including 'S-NSSAI' and 'DNN' attribute identifiers, collect S-NSSAI and DNNs managed by all registered network functions (e.g., NRF), and transmit the collected S-NSSAI and DNNs to the NSCM server 720 (S705).

The NSCM server 720 may store all received S-NSSAI and DNNs (S707), and transmit usable S-NSSAI and DNN information to the VAL server 710 (S709).

Figure 8:
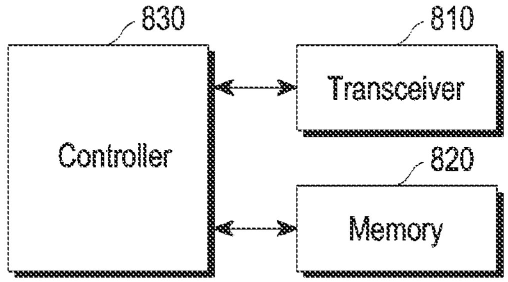
FIG. 8 shows a structure of a VAL server according to an embodiment of the disclosure.

FIG. 8 illustrates the structure of a vertical application layer (VAL) server according to an embodiment of the disclosure.

The VAL server described with reference to FIGS. 1 to 7 may correspond to the VAL server of FIG. 8. Referring to FIG. 8, the VAL server may include a transceiver 810, memory 820, and a controller 830.

According to the communication method of the VAL server described above, the transceiver 810, the controller 830, and the memory 820 of the VAL server may operate.

However, the components of the VAL server are not limited to the above examples. For example, the VAL server may include more or fewer components than those described above. In addition, the transceiver 810, the controller 830, and the memory 820 may be implemented in the form of a single chip. Furthermore, the controller 830 may include one or more processors.

The transceiver 810 is a term collectively referring to a receiver of the VAL server and a transmitter of the VAL server, and may transmit/receive signals to/from other devices. According to an embodiment, the transceiver 810 may be connected to a core network and transmit/receive messages to/from other network entities by using a hypertext transfer protocol (HTTP). According to another embodiment, the transceiver 810 may include an RF transmitter for up-converting and amplifying the frequency of a transmitted signal, and an RF receiver for low-noise amplifying and down-converting the frequency of a received signal. However, this is only an embodiment of the transceiver 810, and components of the transceiver 810 are not limited to the RF transmitter and the RF receiver.

In addition, the transceiver 810 may receive a signal through a wireless channel, output the signal to the controller 830, and transmit a signal, which is output from the controller 830, through a wireless channel.

The memory 820 may store programs and data necessary for the operation of the VAL server. Further, the memory 820 may store control information or data included in a signal acquired from the VAL server. The memory 820 may include a storage medium such as a ROM, a RAM, a hard disk, a CD-ROM, and a DVD, or a combination of storage media. In addition, the memory 820 may not exist separately but may be included in the controller 830.

The controller 830 may control a series of processes so that the VAL server may operate according to the above-described embodiment of the disclosure.

The controller 830 may perform control to transmit, to a network slice capability management (NSCM) server, a first message including an application ID and requesting network slice information. In response to the first message, the controller 830 may perform control to receive, from the NSCM server, a second message including available single-network slice selection assistance information (S-NSSAI) and available data network name (DNN). The controller 830 may determine S-NSSAI and DNN to be used in the VAL server based on the second message. The controller 830 may perform control to transmit a network slice allocation request message including the determined S-NSSAI and DNN to the NSCM server.

According to an embodiment, the network slice allocation request message may further include the application ID and a list of UEs capable of receiving the VAL service.

Figure 9:
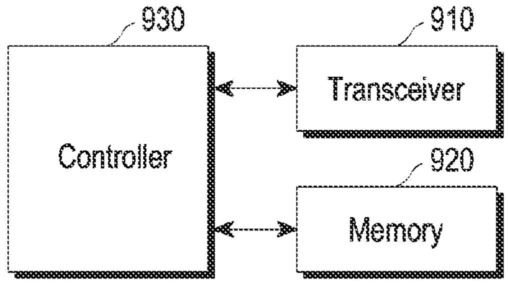
FIG. 9 shows a structure of an NSCM server according to an embodiment of the disclosure.

FIG. 9 illustrates the structure of a network slice capability management (NSCM) server according to an embodiment of the disclosure.

The NSCM server described with reference to FIGS. 1 to 7 may correspond to the NSCM server of FIG. 9. Referring to FIG. 9, the NSCM server may include a transceiver 910, memory 920, and a controller 930.

According to the above-described communication method of the NSCM server, the transceiver 910, the controller 930, and the memory 920 of the NSCM server may operate. However, the components of the NSCM server are not limited to the above examples. For example, the NSCM server may include more or fewer components than those described above. In addition, the transceiver 910, the controller 930, and the memory 920 may be implemented in the form of a single chip. Furthermore, the controller 930 may include one or more processors.

The transceiver 910 is a term collectively referring to a receiver of the NSCM server and a transmitter of the NSCM server, and may transmit and receive signals to and from other devices. According to an embodiment, the transceiver 910 may be connected to a core network and transmit/receive messages to/from other network entities, by using a hypertext transfer protocol (HTTP). According to another embodiment, the transceiver 910 may include an RF transmitter for up-converting and amplifying the frequency of a transmitted signal, and an RF receiver for low-noise amplifying and down-converting the frequency of a received signal. However, this is only an embodiment of the transceiver 910, and components of the transceiver 910 are not limited to the RF transmitter and the RF receiver.

In addition, the transceiver 910 may receive a signal through a wireless channel, output the signal to the controller 930, and transmit a signal, which is output from the controller 930, through a wireless channel.

The memory 920 may store programs and data necessary for the operation of the NSCM server. Further, the memory 920 may store control information or data included in a signal acquired from the NSCM server. The memory 920 may include a storage medium such as a ROM, a RAM, a hard disk, a CD-ROM, and a DVD, or a combination of storage media. In addition, the memory 920 may not exist separately but may be included in the controller 930.

The controller 930 may control a series of processes so that the NSCM server operates according to the above-described embodiment of the disclosure.

The controller 930 may perform control to receive, from a vertical application layer (VAL) server, a first message including an application ID and requesting network slice information. In response to the first message, the controller 930 may perform control to transmit a second message including available single-network slice selection assistance information (S-NSSAI) and available data network name (DNN) to the VAL server. The controller 930 may perform control to receive, from the VAL server, a network slice allocation request message including S-NSSAI and DNN determined by the VAL server based on the second message. According to an embodiment, the first message may further include an application service provider (ASP) ID, and the second message may include at least one S-NSSAI and DNN corresponding to the ASP ID.

The controller 930 may perform control to transmit a third message, in which a network function (NF) type is configured as a session management function (SMF), to a network repository function (NRF). In response to the third message, the controller 930 may perform control to receive a fourth message including information about the S-NSSAI and DNN allocated to the SMF from the NRF.

According to an embodiment, the network slice allocation request message may further include the application ID and a list of UEs capable of receiving the VAL service.

The controller 930 may perform control to transmit, to a user equipment (UE), a network slice information delivery message including the application ID and the S-NSSAI and DNN determined by the VAL server. The controller 930 may perform control to receive a response message with respect to the network slice information delivery message from the UE.

Figure 10:
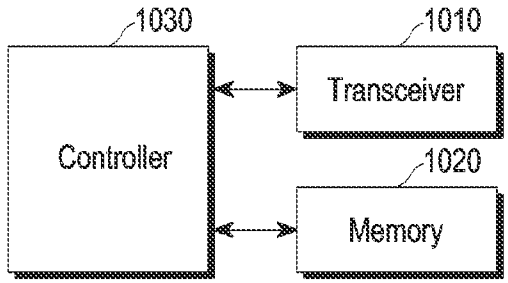
FIG. 10 shows a structure of a UE according to an embodiment of the disclosure.

FIG. 10 shows a structure of a user equipment (UE) according to an embodiment of the disclosure.

The UE described with reference to FIGS. 1 to 7 may correspond to the UE of FIG. 10. Referring to FIG. 10, a gate device may include a transceiver 1010, memory 1020, and a controller 1030.

According to the communication method of the UE described above, the transceiver 1010, the controller 1030, and the memory 1020 of the UE may operate. However, the components of the UE are not limited to the above-described examples. For example, the UE may include more or fewer components than those described above. In addition, the transceiver 1010, the controller 1030, and the memory 1020 may be implemented as a single chip. Furthermore, the controller 1030 may include one or more processors.

The transceiver 1010 is a term collectively referring to a receiver of the UE and a transmitter of the UE, and may transmit/receive signals to/from other devices. To this end, the transceiver 1010 may include an RF transmitter for up-converting and amplifying the frequency of a transmitted signal, and an RF receiver for low-noise amplifying a received signal and down-converting its frequency. However, this is only an embodiment of the transceiver 1010, and components of the transceiver 1010 are not limited to the RF transmitter and the RF receiver.

In addition, the transceiver 1010 may receive a signal through a wireless channel, output the signal to the controller 1030, and transmit a signal, which is output from the controller 1030, through a wireless channel.

The memory 1020 may store programs and data required for operation of the UE. In addition, the memory 1020 may store control information or data included in a signal obtained from the UE. The memory 1020 may include a storage medium such as a ROM, a RAM, a hard disk, a CD-ROM, and a DVD, or a combination of storage media. In addition, the memory 1020 may not exist separately but may be included in the controller 1030.

The controller 1030 may control a series of processes so that the UE operates according to the above-described embodiment of the disclosure.

The controller 1030 may perform control to receive, from a network slice capability management (NSCM), a network slice information delivery message including an application ID and the single-network slice selection assistance information (S-NSSAI) and data network name (DNN) determined by a vertical application layer (VAL) server. The controller 1030 may store the S-NSSAI and the DNN. The controller 1030 may perform control to transmit a response message with respect to the network slice information delivery message to the NSCM server.

The methods according to the embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network(LAN), Wide LAN(WLAN), and Storage Area Network(SAN) or a combination thereof. Such a storage device may access the electronic device via an external port. Furthermore, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, it will be apparent that various modifications and changes may be made thereto without departing from the scope of the disclosure. Therefore, the scope of the disclosure should not be defined as being limited to the embodiments set forth herein, but should be defined by the appended claims and equivalents thereof.

The invention claimed is:

1. A method of operating a network slice capability management (NSCM) server for allocating a network slice in a wireless communication system, the method comprising:

receiving a request message regarding a network slice from a vertical application layer (VAL) server, the request message including an application identifier (ID) and an application service provider (ASP) ID;

in response to the request message regarding the network slice, transmitting a response message regarding the network slice to the VAL server, the response message regarding the network slice including at least one single-network slice selection assistance information (S-NSSAI) and a data network name (DNN) corresponding to the ASP ID; and transmitting a network slice information delivery message including S-NSSAI and the DNN to an NSCM client included in a user equipment (UE).

2. The method of claim 1, further comprising:

transmitting a first message, in which a network function (NF) type is configured as a session management function (SMF), to a network repository function (NRF); and in response to the first message, receiving from the NRF a fourth message including information about the S-NSSAI and DNN allocated to the SMF.

3. The method of claim 1, wherein the network slice information delivery message further comprises the application ID.

4. The method of claim 1, further comprising receiving a response message with respect to the network slice information delivery message from the NSCM client included in the UE.

5. A method of operating a vertical application layer (VAL) server for allocating a network slice in a wireless communication system, the method comprising:

transmitting a request message regarding a network slice to a network slice capability management (NSCM) server, the request message including an application identifier (ID) and an application service provider (ASP) ID; and in response to the request message regarding the network slice, receiving a response message regarding the network slice from the NSCM server, the response message regarding the network slice including at least one single-network slice selection assistance information (S-NSSAI) and a data network name (DNN) corresponding to the ASP ID, wherein a network slice information delivery message including S-NSSAI and the DNN is transmitted from the NSCM server to an NSCM client included in a user equipment (UE).

6. The method of claim 5, wherein the network slice information delivery message further comprises the application ID.

7. A network slice capability management (NSCM) server for allocating a network slice in a wireless communication system, the server comprising:

a transceiver; and a controller connected to the transceiver, wherein the controller is configured to:

receive a request message regarding a network slice from a vertical application layer (VAL) server, the request message including an application identifier (ID) and an application service provider (ASP) ID;

perform control, in response to the request message regarding the network slice, to transmit a response message regarding the network slice to the VAL server, the response message regarding the network slice including at least one single-network slice selection assistance information (S-NSSAI) and a data network name (DNN) corresponding to the ASP ID; and perform control to transmit a network slice information delivery message including S-NSSAI and the DNN to an NSCM client included in a user equipment (UE).

8. The NSCM server of claim 7, wherein the controller is configured to:

perform control to transmit a first message, in which a network function (NF) type is configured as a session management function (SMF), to a network repository function (NRF); and in response to the first message, receive from the NRF a fourth message including information about the S-NSSAI and DNN allocated to the SMF.

9. The NSCM server of claim 7, wherein the network slice information delivery message further comprises the application ID.

10. The NSCM server of claim 7, wherein the controller is configured to receive a response message with respect to the network slice information delivery message from the NSCM client included in the UE.

11. A vertical application layer (VAL) server for allocating a network slice in a wireless communication system, the VAL server comprising:

a transceiver; and a controller connected to the transceiver, wherein the controller is configured to:

perform control to transmit a request message regarding a network slice to a network slice capability management (NSCM) server, the request message including an application identifier (ID) and an application service provider (ASP) ID; and in response to the request message regarding the network slice, receive a response message regarding the network slice from the NSCM server, the response message regarding the network slice including at least one single-network slice selection assistance information (S-NSSAI) and a data network name (DNN) corresponding to the ASP ID, wherein a network slice information delivery message including S-NSSAI and the DNN is transmitted from the NSCM server to an NSCM client included in a user equipment (UE).

12. The VAL server of claim 11, wherein the network slice information delivery message further comprises the application ID.

* * * * *